Nov. 2, 1965 C. E. ANDERSON ETAL 3,215,157
VALVE SEAT STRUCTURE HAVING PRESSURE-ACTUATED SEAL MEANS
Filed Jan. 30, 1963 3 Sheets-Sheet 1

Clifford E. Anderson
William E. Lowrey
INVENTORS

BY Russell E. Schloss
ATTORNEY

Clifford E. Anderson
William E. Lowrey
INVENTORS

BY
Russell E. Schloff
ATTORNEY

United States Patent Office 3,215,157
Patented Nov. 2, 1965

3,215,157
VALVE SEAT STRUCTURE HAVING PRESSURE-ACTUATED SEAL MEANS
Clifford E. Anderson and William E. Lowrey, Houston, Tex., assignors to ACF Industries, Incorporated, New York, N.Y., a corporation of New Jersey
Filed Jan. 30, 1963, Ser. No. 254,999
9 Claims. (Cl. 137—246)

This invention relates generally to valves, and more particularly to a through conduit gate valve having a slab gate member and cooperating seat members which form a seal both upstream and downstream.

Gate valves, particularly through conduit gate valves, which when open present an unbroken smooth wall conduit for uninterrupted passage of flow therethrough, are widely used because of their desirable flow characteristics. When in the open position, the straight-through passage, which is provided, offers no more appreciable resistance to fluid flow than an equal length of pipe. Although good flow characteristics are important, an even more important aspect of any valve is its ability to seal. While in certain installations it is only necessary for a valve to stop flow from passing out of the downstream side, there are other installations where it is necessary that the valve stops flow on the upstream side thereby blocking flow from entering the valve chamber. An upstream seal is also necessary for block and bleed service, i.e., service where the valve chamber can be bled to indicate leakage past either seat.

In through conduit gate valves, line pressure aids in establishing a seal at the downstream side by forcing the gate into intimate contact with the downstream seat member. Generally speaking, since line pressure at the same time tends to move the gate away from the upstream seat, it is more difficult to establish an upstream seal. One method of obtaining effective downstream and upstream seals for gate valves has been to provide means whereby the gate member is mechanically forced into sealing engagement with both the upstream and downstream seats. While such valves provide an effective seal, they are fairly expensive to manufacture inasmuch as they require mechanism to expand the gate the necessary amount to obtain a tight seal in the closed position and also mechanism to retract or collapse the gate when it is being moved to the open position. Another deterrent in establishing effective seals is that it is inherently difficult to establish a bubble tight seal between two metal surfaces. Several means have been used to alleviate this condition. One has been to inject a heavy viscous lubricant or sealant between the two surfaces which will aid in establishing the seal. However, where sealant is essential to the establishing of a seal, the necessary constant maintenance to see that the valve is properly lubricated is time consuming and expensive. Other means used to effect seals has been the utilization of rubber or other resilient materials; however, such materials are subject to swell in many common ladings. O-rings have also been used, but they usually require special fixtures to prevent disengagement when moving the valve from one position to another. A means which has been useful in establishing a seal has been providing the sealing face of the seat member with an annular ring of plastic deformable material such as polytetrafluoroethylene, commonly available in the United States under the trademark "Teflon." Such a seal is shown and described in . S. Downs et al. United States Patents 2,925,993 and !,925,994. The utilization of this seal has made more practical the development of an upstream seal without the use of mechanical force.

While the Teflon insert makes an excellent seal and provides a low friction surface for the gate to ride against, it is desirable that flow can be stopped even though the Teflon insert has been damaged. In order to accomplish this, the valve of the present invention is provided with means so that, in an emergency, flow can be stopped even though the plastic insert or metal surfaces have been damaged.

Also, the Teflon insert due to inherent modulus of elasticity may not completely effect a seal at very low pressure differentials. In order to effect a seal at low or no pressure differential, the valve of the present invention is provided with an annular insert with a low modulus of elasticity which effects the desired seal by slight compression built into the valve.

The through conduit gate valve of the present invention is comprised of a housing with a bore therethrough. A valve chamber intersects the bore and a reciprocating slab gate or valve member is located in the valve chamber. The gate member is provided with a passage which is alignable with the bore in the open position providing the through conduit. A solid portion covers the bore in the closed position. There are two facing annular recesses surrounding the bore. In each of the recesses there is positioned a seat member. Each seat member is formed of an annular ring having a smaller outer diameter than the wall of the recess whereby each seat member loosely fits into its recess. Each seat member has a passage which forms a portion of the bore. The axial length of each seat member is greater than the axial length of the recess whereby a portion of the seat member protrudes into the valve chamber forming a sealing face for cooperation with a face of the gate member. Each sealing face of the seat member is provided with an annular groove. Secured in the groove is a Teflon insert forming a plastic sealing member which extends above the plane of the sealing face to form an annular ring of sealing contact area. Each sealing face is also provided with an annular elastomer insert which extends above the plane of the sealing face to form a compression type seal at low or no differential pressure. Each seat member also has an axially outward face which opposes the end wall of its recess. The radially outer corner of the axially outer face is provided with a generally rectangular notch which together with the corner formed by the end wall and annular wall of the recess forms a generally rectangular chamber. The axially extending wall of the seat forming the notch diverges outwardly to form a slight hook. A resilient O-ring in its untensioned condition having an outer diameter slightly smaller than the diameter of the notch of the seat member and an axial thickness substantially greater than the axial depth of the chamber is located in each chamber. The gate member, sealing surfaces of the seat member, and the distance between the end walls of the recesses are so proportioned that there is a controlled interference between all sealing surfaces on assembly. Therefore, the elastomer insert establishes a seal which is effective at little or no differential. Additionally, the O-ring establishes a seal between the seat member and its recess. On the upstream side, line pressure will flow in back of the seat where it will be arrested by the O-ring. Since the Teflon and elastomer inserts have established an initial seal between the gate and upstream seat, the line pressure will build up increasing the contact between the Teflon insert and gate resulting in a tight seal because of the greater pressure area on the back of the seat. Line pressure will also act on the gate moving it downstream and due to the line pressure in back of the upstream seat the upstream seal will follow maintaining an effective seal.

To provide emergency lubrication, the seat member has an annular groove about its periphery axially inward of the corner notch. A resilient O-ring is positioned therein forming a seal with the annular wall of the recess. Each seat member is provided with a second annular groove about its periphery which is positioned between the first annular peripheral groove and the corner notch. Also, the sealing face of the seat member is provided with an annular groove of greater diameter than the deformable plastic sealing member and a passage connects the annular sealing face groove with the second annular peripheral groove. The housing is provided with a passage having one end communicating with the second annular groove and the other end provided with a lubricant fitting to permit the introduction of sealant to the sealing face of the seat members. This permits the injection of sealant to the sealing face to provide an emergency means of establishing a seal. These two O-rings form a barrier which directs the sealant through the passage to the sealing face. The sealant system is so designed that on the injection of sealant into the valve there will be a resultant force which moves the seat forward to maintain contact with the gate. Sealant will not enter and contaminate the lading since the plastic seal is between the lubricant groove and bore.

The seat members are so proportioned that if the internal pressure in the body increases due to such causes as thermal expansion, the increased pressure will cause the uptream seat to move back in its pocket permitting the relieving of excessive pressure.

It is an object of the present invention to provide a through conduit gate valve having a slab gate with pressure activated seat members provided with a sealing member having a low modulus of elasticity on the sealing faces.

It is another object to provide a through conduit gate valve with a slab gate and pressure activated seat members having a deformable plastic sealing member on their sealing faces which will relieve excessive body pressure upstream.

It is another object to provide a through conduit slab gate valve having pressure acting seats which establish an upstream seal from either direction.

It is a further object to provide a through conduit gate valve having pressure acting seats in which there is provision within the seat members to provide emergency sealant to the face of the sealing member to provide an emergency seal.

It is still a further object to provide a through conduit gate valve having pressure acting seat members having plastic sealing members on their sealing face and provisions whereby in an emergency sealant can be supplied to the sealing faces to provide an emergency seal.

It is still a further object to provide a valve having pressure activated seats with an emergency sealant system which is so designed that on injection of sealant there will be a resultant force keeping the seat in contact with the gate.

It is still a further object to provide a valve having a pressure activated seat in which provision is made to easily assemble the pressure actuating O-ring in its pocket.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein.

Figure 1:
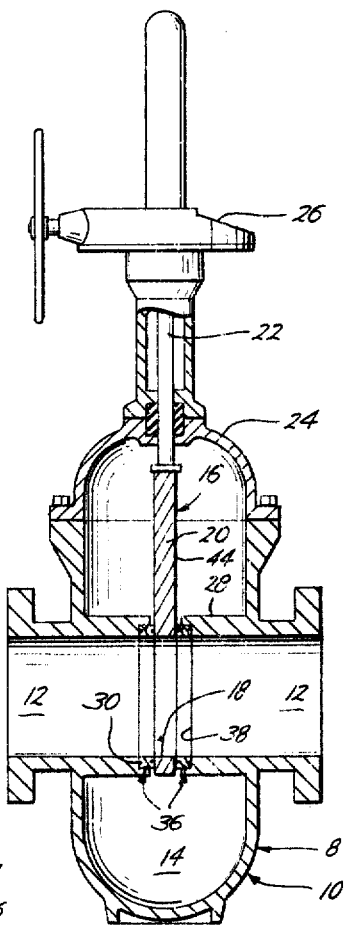
FIG. 1 is an elevational view in section illustrating a gate valve of the present invention.
Figure 6:
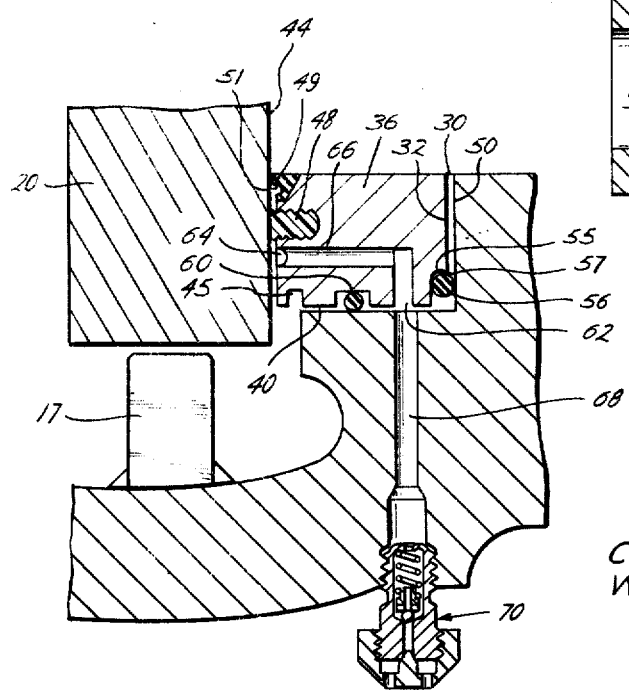
FIG. 6 is an enlarged cross sectional view of the seat member of FIG. 1 positioned in a pocket showing the sealant system.

Referring now to the drawings, FIG. 1 illustrates a through conduit gate valve 8 made in accordance with the present invention. The gate valve 8 has a housing 10 having a bore 12 therethrough. The bore 12 forms aligned flow passages. The outer ends of the flow passages are shown terminating in flanges which permit the valve 8 to be connected to a flow system. Naturally, any other of the various well known means of finishing ends for the connection of a valve to a flow system may be utilized.

Intersecting the bore 12 is a valve chamber 14 in which is located a reciprocating slab gate member 16 guided in its reciprocatory movement by a gate guide 17. The valve member 16 consists of a substantially flat metal plate having a passage 18 which is adapted to register with the bore 12 in the valve open position, the position shown in FIG. 1, and a solid portion 20 which covers the bore 12 in the valve closed position, the position shown in FIGS. 2, 3 and 4. Passage 18 in registering with the bore 12 forms an unbroken smooth wall conduit for the uninterrupted passage of flow therethrough which offers no more appreciable resistance to fluid flow than an equal length of pipe. The upper end of the gate member 16 is attached to means, such as a stem 22, for raising and lowering the gate 16. As is well known in the valve art, a bonnet 24 closes the valve chamber 14 and the stem 22 extends through a sealed passage in the bonnet 24. To move the stem 22 the upper end thereof is threaded and connectively engaged with a bevel gear operator 26, handwheel, or any of the various other types of operations well known in the art.

The valve chamber end of the bores 12 terminate in hub portions 28—28 which extend into the valve chamber 14. The hub portions 28—28 are machined to form annular recesses or seat pockets 30—30 which surround the bore 12. Each recess 30 has an end wall 32 which intersects the bore 12, an annular wall 34 which is coaxial with the bore 12. One side of each recess 30 is open to the bore and there is also an end of the recess which is open to the valve chamber 14. Positioned in each of the recesses 30 is a pressure-actuated seat member 36.

Each seat member 36 is formed of an annular ring having a passage 38 which is coaxial with and is the same diameter as the bore 12. This passage 38 forms a part of the through conduit when the valve is in the open position. The outer diameter 40 of the seat member 36 is smaller than the diameter of the annular wall 34 of the recess whereby each seat member 36 loosely fits into its recess. The axial length of each seat member is greater than the axial length of its recess whereby a portion of the seat member protrudes past the end of the hub 28 into the valve chamber to form a sealing face 42 which cooperates with a sealing face 44 of the gate member 16. The seat 36 has a groove 45 about its outer periphery adjacent the end of the hub 28 to help pry the seat out of the pocket 30.

The sealing face 42 of each seat member is provided with an annular groove 46 in which there is positioned a deformable plastic insert or sealing member 48. As previously mentioned, the insert is preferably formed of Teflon. In order to maintain the insert 48 in the groove 46, it has been found desirable to provide the sides of the annular groove 46 with a series of thread serrations which grip the walls of the insert and prohibit its extrusion. The plastic sealing member 48 extends slightly above the plane of the sealing face 42 to form an annular ring of sealing contact area. The extent which the plastic sealing members extend above the plane is in the neighborhood of .005–.007" which has been found to be sufficient. The sealing face end of the passage 38 is provided with a bevel on which is attached an annular insert 49 having a lower modulus of elasticity than the Teflon insert 48. If desired, an elastomer having a durometer in the range of 70 to 90 may be used. The elastomer insert extends approximately .018" above the face 42 of the seat. The elastomer insert 49 may be provided with a groove 51 into which the elastomer may flow.

Each seat member 36 has an axial outer face 50 which opposes the end wall 32 of the recess 30. As previously mentioned, the seat members 36—36 are pressure actuated. In order to accomplish this pressure actuation, the radially outer corner of the axially outer face 50 of each seat member 36 is provided with a generally rectangular notch 52 which together with a corner formed by the end wall 32 and annular wall 34 of the recess forms a generally rectangular chamber 54. The notch 52 has an axially extending wall 55 which diverges from the axial centerline of the passage 38 forming a nose 57. Positioned in the chamber 54 is a resilient O-ring 56 having an untensioned inner diameter considerably less than the diameter of the wall 55, a thickness substantially less than the radial depth of the chamber 54, but greater than the axial length of the chamber 54. Since the O-ring 56 has an initial inner diameter substantially less than the diameter of the wall 55 it has to be stretched to go over the nose 57 and the nose 57 then retains it in position making it easy to insert the seat 36 into the pocket 30 without danger of the O-ring 56 becoming disengaged. The O-ring 56 is a greater thickness than the axial length of the chamber 54 so that it will extend past the axial outer face 50 of the seat member 36 and form sealing contact with the end wall 38 of the recess 30. At the same time the thickness is less than the radial length of the chamber so that if the O-ring swells due to a reaction with the lading there will be space to accommodate such swell.

The gate member 16, sealing surfaces of the seat member, that is the face of the annular plastic ring 48 and elastomer insert 49, and the O-ring 56, and the distance between the end walls 32—32 of the recesses 30—30 are so proportioned that there is an interference between all sealing surfaces on assembly. This interference establishes an initial seal between the elastomer insert 49 and the face 44 of the gate and facilitates a differential pressure building up behind the upstream seat to effect pressure activation thereof. The O-ring 56 establishes a seal between the seat member 36 and the annular wall 34 of the recess 30. Therefore, on the upstream side line pressure will flow in back of the seat 36 until it is arrested by the O-ring 56. Since the annular plastic insert 48 and elastomer insert 49 have established an initial seal between the face 44 of the gate and the sealing face 42 of the upstream seat, the line pressure will build up increasing the contact between the annular plastic ring 48 and the sealing surface 44 of the gate resulting in a tight seal. Line pressure will also act on the gate 16 moving it downstream and due to the line pressure in back of the upstream seat the upstream seat 36 will follow maintaining an effective seal between the annular ring 48 of the upstream seat and the sealing face 44 of the gate 16. The elastomer insert 49 having a low modulus of elasticity will maintain a seal with the face 44 of the gate at no or low differential pressure.

In normal operating conditions, the contact between deformable plastic insert 48 and the sealing face 44 of the gate 16 provides a very tight seal, and no auxiliary means such as constantly providing lubricant or sealant between the sealing faces of the seat and gate is necessary.

However, the valve of the present invention is provided with means which will permit introducing a film of lubricant or sealant between the sealing faces of the seat members and gate in an emergency to stop leakage in the event that the annular plastic insert 48 is damaged or for some other reason the valve will not seal drop-tight. In order to provide this lubrication, seat member 36 is provided with an annular groove 58 about its periphery axially inward of the corner notch 52. The groove 58 is generally rectangular in shape and positioned therein is a resilient O-ring 60. The thickness of the O-ring 60 is such that it is greater than the radial depth of the groove and less than the axial length of the groove 58. The O-ring 60 establishes a seal between the outer diameter of the seat member and the annular wall 34 of the recess. Positioned between the annular groove 58 and the corner notch there is a second annular groove 62. The sealing face 42 of the seat member 36 is provided with an annular groove 64 which is of a greater diameter than the groove 46 containing the annular insert 48. Several passages 66 spaced around the annular groove 64 connect the annular groove 64 on the sealing face 42 with the second annular peripheral groove 62. The housing 10 is provided with a passage 68 which has one end in communication with the second annular groove 62 and the other end provided with a lubricant fitting 70. Sealant introduced through the lubricant fitting 70 flows through the groove 68 into and around the annular groove 62 then through the passage 66 and into the annular groove 64 on the sealing face 42 of the seat where it can form a bridgement with the sealing face 44 of the gate 16. The two O-rings 56 and 60 form a barrier which directs the sealant coming through the passage 68 into the annular groove 62 through the passage 66 and into the annular groove 64. The sealant system is so proportioned that during the application of sealant the resultant force of the sealant being introduced through the lubricant fitting 70 results in a movement of the seat 36 toward the sealing face of the gate retaining the seat always in constant contact with the sealing face 44 of the gate. The forward movement of the seat results from the fact the sealant acts on a greater area on the end wall 32 of the recess 30 than on the sealing face 44 of the gate member 16; and since pressure is equal in both cases, the larger area at the back will create a larger force than the reactive force created by the pressure of the sealant against a smaller area on the sealing face 44 of the gate 16. In other words, sealant will flow through the passage 68 into and around the annular groove 62. It will then flow in between the peripheral wall 40 of the seat member 36 and the annular wall 34 of the recess 30 until it contacts O-rings 60 and 56. The seal at the O-ring 56 will be at the outer diameter of the seat pocket whereas the seal created by the O-ring 56 will be at the radial inward end of the corner notch 52. The pressure behind the sealant will therefore be applied to this area and will tend to move the seat 36 forward toward the sealing face 44 of the gate 16. At the same time, sealant will flow through the numerous passages 66 and into the groove 64 where the pressure will be opposed by the sealing face 44 of the gate 16. The force created at the sealing face will tend to move the seat member 36 back toward the end wall 16 of the recess 30. However, the area of the groove 64 is smaller than the area at the back of the seat 36, therefore the force will be less. There will always be a resultant effect tending to push the sealing face of the seat tightly against the sealing face of the gate which will maintain the gap between the sealing faces at a minimum thereby enhancing the ability of the sealant to effect a seal.

Figure 2:
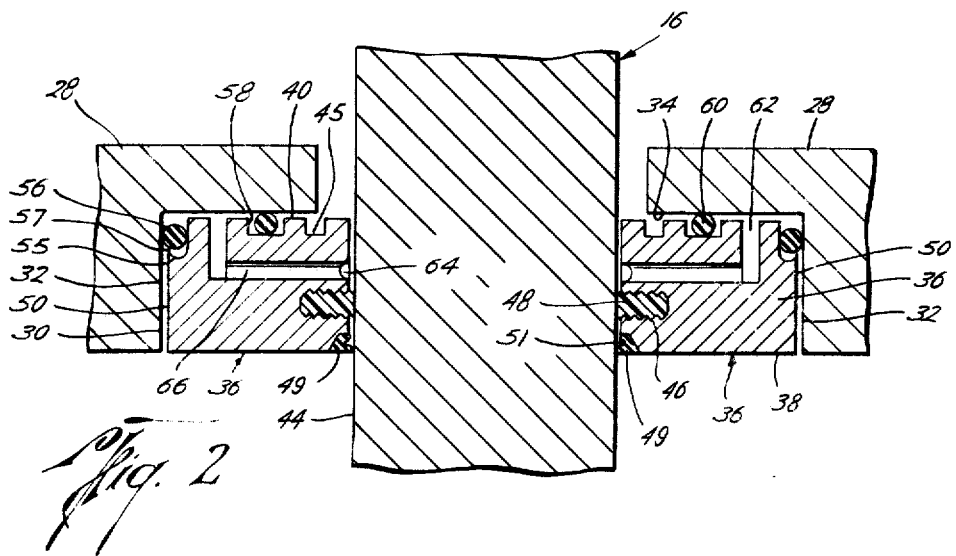
FIG. 2 is a diagrammatic view of the gate and seat members illustrating the initial interference on assembly.

As previously mentioned, the various elements in the valve are so proportioned that upon assembly there will be controlled interference between the sealing faces 44 of the gate 16 and the sealing faces of the annular inserts 48 and 49. Also, the O-ring 56 will be in sealing contact with rear wall 32 of the pocket 30. This condition is shown in FIG. 2. Therefore, at extremely low pressures there will be seals between the annular insert 49 and the sealing face 44 of the gate and between the seat member 36 and its recess 30.

Figure 3:
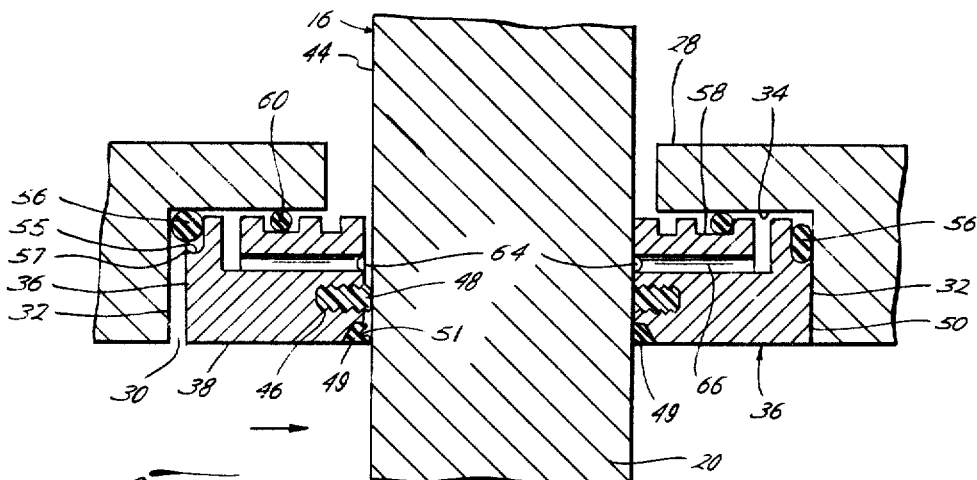
FIG. 3 is a view similar to FIG. 2 showing the seals established in the closed position during normal operation of the valve.

FIG. 3 shows the seals established during normal operation of the valve being moved to the closed position with the downstream seat properly functioning. As can be seen, line pressure will act on the gate moving it toward the downstream side pushing the seat member 36 back into its pocket 30 where the O-ring 56 will establish a seal between the recess 30 and the annular wall of the seat member 36 prohibiting fluid from flowing between the seat and its recess. The annular inserts 48 and 49 establish an initial seal with the sealing face 44 of the gate. If the pressure is sufficiently great, the gate may be forced into metal-to-metal contact with the downstream seat causing the annular insert 48 to even more tightly form a seal with the sealing face of the gate. As previously mentioned, the initial assembly causes the annular sealing member 48 of the upstream seat to form a seal with the sealing face 44 on the upstream side of the gate and there is sufficient compression in the upstream O-ring 56 that the upstream seat will remain in contact.

Figure 4:
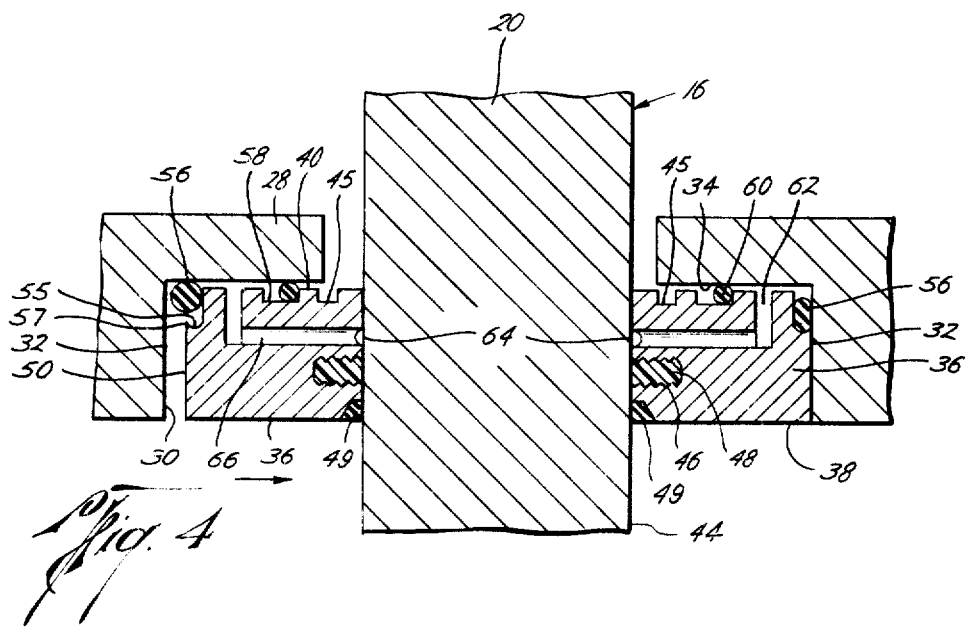
FIG. 4 is a view similar to FIG. 3 showing the pressure actuated upstream seal when pressure in the body is less than the upstream pressure.
Figure 5:
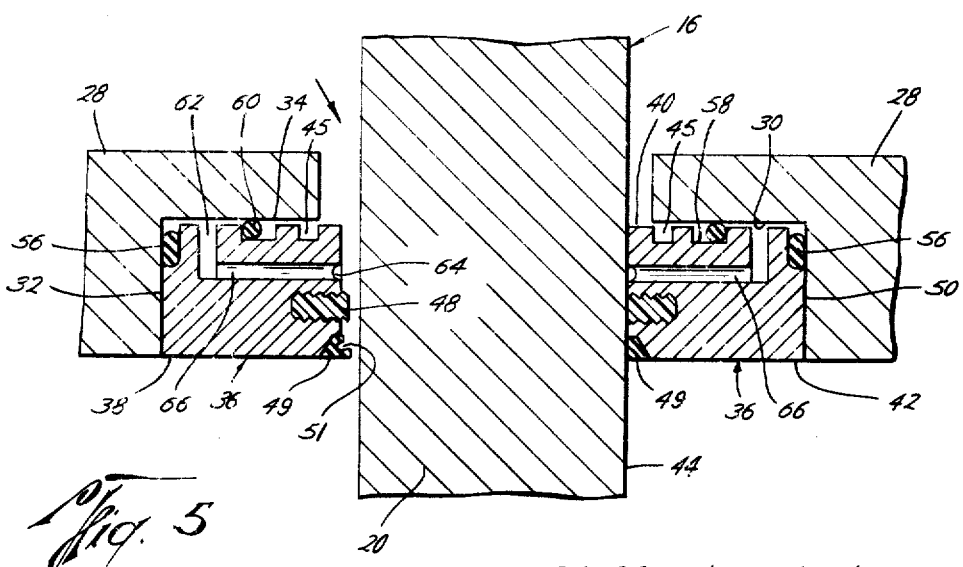
FIG. 5 is a view similar to FIG. 2 showing the upstream seat member relieving excessive body pressure.

If desired to use the valve for block and bleed service and the pressure from the valve chamber 16 is bled off, line pressure will flow between the end wall of the upstream recess and the axial outer wall of the seat member and will be arrested by the O-ring 56. The line pressure will force the upstream seat out of its recess into sealing contact with the upstream side face of the gate. This is particularly true since the area acted upon by the line pressure on the axially outward side of the upstream gate is greater than the area acted on by the line pressure on the sealing face of the gate which only extends from the passage 38 to the point of contact formed by the annular deformable plastic sealing ring 48. Accordingly, the higher the line pressure the more intimate will be the contact between the annular plastic ring 48 of the upstream seat and the upstream sealing face of the gate 16. This condition is shown in FIG. 4. The same action will take place should the downstream seat leak which will cause a pressure differential actuating the pressure actuated upstream seat.

It has been found that the annular deformable plastic ring 48 will compensate for most minor scratches and abrasions in the sealing face of the gate. However, should a portion of the annular plastic deformable ring 48 become damaged the valve can still be sealed by the emergency sealant system previously described. In order to operate the sealant system, a lubricant gun is attached to the fitting 70 and sealant under pressure is forced through the lubricant fitting 70 through the passage 68. It then flows around the annular groove 62 through the various passages 66 to the annular groove 64 on the sealing face 38 of the seat member. The sealant used for such purposes is a heavy, viscous substance which is impervious to the lading flowing through the valve and which will establish a seal between the seat and gate. In order that the sealant does not force the upstream seat back in its recess and therefore enlarge the gap between the sealing face of the upstream seat and the corresponding sealing face of the gate, the sealant groove system is so proportioned that the injection of sealant will result in a force which will tend to initially move the seat toward the gate member rather than back into its pocket 30. Therefore, on initial injection the seat 36 will tend to embrace the sealing face 44 of the gate and the gap will not be of such a magnitude that the viscous sealant can not effectively seal. On excessive injection, the sealant will be relieved into the valve chamber 14 since the plastic insert 48 is between the bore 38 and lubricant groove 64. If injection is continued sufficient pressure will build up to relieve across the face of the gate preventing body rupture.

As previously mentioned, the upstream seal will be always forced against the gate member; however, should the pressure in the body increase due to thermal expansion as a result in increase of ambient temperature or for other reasons, the increased pressure acting on the area of the seat between the outside diameter of the seat and the annular plastic insert 48 will build up to such a point that it will momentarily push the seat member 36 back into the recess allowing the fluid trapped in the body to escape past the annular insert and thereby relieving the pressure in the body. The seat has been so proportioned that this will always take place prior to such an increase in body pressure which would permanently deform the body.

As can be seen from the foregoing, a valve constructed in accordance with the present invention has pressure acting seats whereby a seal will be effected on the upstream side regardless of which side is upstream. The seats being provided with an annular plastic insert and annular elastomer insert will easily effect a drop-tight seal; however, should the sealing faces of the gate or seat become damaged to such an extent that they will no longer seal, provision has been made to provide sealant between the faces to effect a seal. The sealant system is so designed that upon injection of sealant the seat will move toward the gate maintaining the gap between the two sealing faces at a minimum.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What we claim is:

1. A through conduit gate valve comprised of a housing with a bore therethrough, a valve chamber intersecting said bore, a reciprocating slab gate member located in said valve chamber, said gate member provided with a passage alignable with the bore in the open position and a solid portion to cover said bore in the closed position, facing annular recesses surrounding said bore, each recess having an end wall intersecting the bore, an annular wall coaxial with the bore, one side open to the bore and one end open to the valve chamber, a seat member in each of said recesses, each seat member formed of an annular ring having a lesser outer diameter than the annular wall of its recess whereby each seat member loosely fits into its recess, each seat member provided with a passage aligned with the bore, the axial length of each seat member being greater than the axial length of its recess whereby a portion of each seat member protrudes into the valve chamber to form a sealing face for cooperation with a face of the gate member, the periphery of each seat having an annular groove adjacent the outer end of the recess to permit insertion of a tool to expedite disassembly, each sealing face provided with an annular groove, a deformable plastic sealing member positioned in said annular groove, said deformable plastic sealing member extending beyond the plane of the sealing face to form an annular ring of sealing contact area, the inner wall of each seat member provided with a notch, an elastomer sealing member in said notch, said elastomer sealing member extending beyond the plane of the plastic sealing member to effect a low differential pressure seal, each seat member having an axially outward face which opposes the end wall of its recess, the radially outer corner of said axially outward face provided with a generally rectangular notch which together with the corner formed by the end wall and the annular wall of the recess forms a generally rectangular chamber, the axially extending notch diverging slightly outward of the axial center line to provide a nose portion at the axial outer end of the notch, a resilient O-ring positioned in said chamber forming a seal between the seat member and its recess, said O-ring having an initial inner diameter slightly less than the outer diameter of the axially extending notch of the seat member so that it is restrained by the nose of the notch and a thickness substantially greater than the axial length of the chamber, the gate member, sealing surface of the seat member and the distance between the end walls of the recesses being so proportioned that there is a slight interference between all sealing surfaces on assembly, the seat member having an annular groove about its periphery axially inward of the corner notch, said groove being generally rectangular in shape, a resilient O-ring positioned in said annular peripheral groove, the thickness of said O-ring being such that it is greater than the radial depth of the groove and less than the axial length of the groove, said seat member provided with a second annular groove about its periphery, said second groove positioned between the first annular peripheral groove and corner notch, the sealing face of the seat member provided with an annular groove of greater diameter than the deformable plastic sealing member, a number of spaced passages connecting the annular groove of the sealing face with the second annular peripheral groove, the housing provided with a passage having one end communicating with the second annular peripheral groove and the other end provided with a lubricant fitting to permit the introduction of sealant to the sealing face of the sealing member, the O-ring defining a restraining chamber whereby the sealant introduced through the fitting is directed into the second annular peripheral groove, passage and sealing face annular groove, the differential in the areas of the restraining chamber being such that there is a resultant force tending to force the upstream seat forward to more intimate contact with the gate, the reactive force of the sealant against the gate being of a lesser magnitude than the force tending to move the seat forward.

2. A through conduit gate valve comprised of a housing with a bore therethrough, a valve chamber intersecting said bore, a reciprocating slab gate member located in said valve chamber, said gate member provided with a passage alignable with the bore in the open position and a solid portion to cover said bore in the closed position, facing annular recesses surrounding said bore, each recess having an end wall intersecting the bore, an annular wall coaxial with the bore, one side open to the bore and one end open to the valve chamber, a seat member in each of said recesses, each seat member formed of an annular ring having a lesser outer diameter than the annular wall of its recess whereby each seat member loosely fits into its recess, each seat member provided with a passage aligned with the bore, the axial length of each seat member being greater than the axial length of its recess whereby a portion of each seat member protrudes into the valve chamber to form a sealing face for cooperation with a face of the gate member, the periphery of each seat having an annular groove adjacent the outer end of the recess to permit insertion of a tool to expedite disassembly, each sealing face provided with an annular groove, a deformable plastic sealing member extending beyond the plane of the sealing face to form an annular ring of sealing contact area, the inner wall of each seat member provided with a notch, an elastomer sealing member in said notch, said elastomer sealing member extending beyond the plane of the plastic sealing member to effect a low differential pressure seal, each seat member having an axially outward face which opposes the end wall of its recess, the radially outer corner of said axially outward face provided with a notch which together with the corner formed by the end wall and the annular wall of the recess forms a chamber, the axially extending notch diverging slightly outward of the axial center line to provide a nose portion at the axial outer end of the notch, a resilient O-ring positioned in said chamber forming a seal between the seat member and its recess, said O-ring having an initial inner diameter slightly less than the outer diameter of the axially extending notch of the seat member so that it is restrained by the nose of the notch, and a thickness greater than the axial length of the chamber, the gate member, sealing surfaces of the seat member and the distance between the end walls of the recesses being so proportioned that there is a slight interference between all sealing surfaces on assembly, the seat member having an annular groove about its periphery axially inward of the corner notch, a resilient O-ring positioned in said annular peripheral groove to form a seal between the peripheral wall of the seat member and the annular wall of the recess, said seat member provided with a second annular groove about its periphery, said second groove positioned between the first annular peripheral groove and corner notch, the sealing face of the seat member provided with an annular groove of greater diameter than the deformable plastic sealing member, a number of passages connecting the annular groove of the sealing face with the second annular peripheral groove, the housing provided with a passage having one end communicating with the second annular peripheral groove and the other end provided with a lubricant fitting to permit the introduction of sealant to the sealing face of the sealing member, the O-rings defining a restraining chamber whereby the sealant introduced through the fitting is directed into the second annular peripheral groove, passage and sealing face annular groove, the differential in the areas of the restraining chamber being such that there is a resultant force tending to force the upstream seat forward to more intimately contact with the gate and the reactive force of the sealant against the gate being of a lesser magnitude than the force tending to move the seat forward.

3. A through conduit gate valve comprised of a housing with a bore therethrough, a valve chamber intersecting said bore, a reciprocating slab gate member located in said valve chamber, said gate member provided with a passage alignable with the bore in the open position and a solid portion to cover said bore in the closed position, facing annular recesses surrounding said bore, each recess having an end wall intersecting the bore, an annular wall coaxial with the bore, one side open to the bore and one end open to the valve chamber, a seat member in each of said recesses, each seat member formed of an annular ring having a lesser outer diameter than the annular wall of its recess whereby each seat member loosely fits into its recess, each seat member provided with a passage aligned with the bore, the axial length of each seat member being greater than the axial length of its recess whereby a portion of each seat member protrudes into the valve chamber to form a sealing face for cooperation with a face of the gate member, each sealing face provided with an annular groove, a deformable plastic sealing member positioned in said annular groove, said deformable plastic sealing member extending beyond the plane of the sealing face to form an annular ring of sealing contact area, the inner wall of each seat member provided with a notch, an elastomer sealing member in said notch, said elastomer sealing member extending beyond the plane of the plastic sealing member to effect a low differential pressure seal, each seat member having an axially outward face which opposes the end wall of its recess, the radially outer corner of said axially outward face provided with a notch which together with the corner formed by the end wall and the annular wall of the recess forms a chamber, the axially extending notch diverging slightly outward of the axial center line to provide a nose portion at the axial outer end of the notch, a resilient O-ring positioned in said chamber forming a seal between the seat member and its recess, said O-ring having an initial inner diameter slightly less than the outer diameter of the notch in the axial outer corner of the seat member so that it is restrained by the nose of the notch, and a thickness greater than the axial length of the chamber, the seat member having an annular groove about its periphery axially inward of the corner notch, a resilient O-ring positioned in said annular peripheral groove to form a seal between the peripheral wall of the seat member and the annular wall of the recess, said seat member provided with a second annular groove about its periphery, said second groove positioned between the first annular peripheral groove and corner notch, the sealing face of the seat member provided with an annular groove of greater diameter than the deformable plastic sealing member, a number of passages connecting the annular groove of the sealing face with the second annular peripheral groove, the housing provided with a passage having one end communicating with the second annular peripheral groove and the other end provided with a lubricant fitting to permit the introduction of sealant to the sealing face of the sealing member, the O-rings defining a restraining chamber whereby the sealant introduced through the fitting is directed into the second annular peripheral groove, passage and sealing face annular groove, the sealant system being so proportioned that the forces developed by sealant being injected are such that there is a resultant force tending to move the seat out of its pocket into an intimate contact with the gate maintaining the gap between the sealing faces of the seat and gate at a minimum.

4. A valve comprised of a housing with a bore therethrough, a valve chamber intersecting said bore, a valve member located in said valve chamber, said valve member provided with a passage alignable with the bore in the open position and a solid portion to cover said bore in the closed position, facing annular recesses surrounding said bore, each recess having an end wall intersecting the bore, an annular wall coaxial with the bore, one side open to the bore and one end open to the valve chamber, a seat member in each of said recesses, each seat member formed of an annular ring having a lesser outer diameter than the annular wall of its recess whereby each seat member loosely fits into its recess, each seat member provided with a passage aligned with the bore, a portion of each seat member forming a sealing face for cooperation with a face of the valve member, each sealing face provided with an annular groove, a deformable plastic sealing member positioned in said annular groove, said deformable plastic sealing member extending beyond the plane of the sealing face to form an annular ring of sealing contact area, the inner wall of each seat member provided with a notch, an elastomer sealing member in said notch, said elastomer sealing member extending beyond the plane of the plastic sealing member to effect a low differential pressure seal, each seat member having an axially outward face which opposes the end wall of its recess, the radially outer corner of said axially outward face provided with a notch which together with the corner formed by the end wall and the annular wall of the recess forms a chamber, the axially extending notch diverging slightly outward of the axial center line to provide a nose portion at the axial outer end of the notch, a resilient O-ring positioned in said chamber forming a seal between the seat member and its recess, said O-ring having an inner diameter slightly less than the outer diameter of the notch in the axial outward face of the seat member so that it is restrained by the nose of the notch, and a thickness greater than the axial length of the chamber, the valve member, sealing surfaces of the seat members and the distance between the end walls of the recesses being so proportioned that there is a slight interference between all sealing surfaces on assembly.

5. A through conduit gate valve comprised of a housing with a bore therethrough, a valve chamber intersecting said bore, a reciprocating slab gate member located in said valve chamber, said gate member provided with a passage alignable with the bore in the open position and a solid portion to cover said bore in the closed position, facing annular recesses surrounding said bore, each recess having an end wall intersecting the bore, an annular wall coaxial with the bore, one side open to the bore and one end open to the valve chamber, a seat member in each of said recesses, each seat member formed of an annular hub portion having a lesser outer diameter than the annular wall of its recess whereby each seat member loosely fits into its recess, each seat member provided with a passage aligned with the bore, the axial length of the hub portion being slightly greater than the axial length of the portion, each seat member having a flange portion provided with a front face which protrudes into the valve chamber to form a sealing face for cooperation with a face of the gate member, and a rear face which contacts the wall surrounding the recess, each sealing face provided with an annular groove, a deformable plastic sealing member positioned in said annular groove, said deformable plastic sealing member extending beyond the plane of the sealing face to form an annular ring of sealing contact area, the inner wall of each seat member provided with a notch, an elastomer sealing member in said notch, said elastomer sealing member extending beyond the plane of the plastic sealing member to effect a low differential pressure seal, the hub portion of each seat member having an axially outward face which opposes the end wall of its recess, the radially outer corner of said axially outward face provided with a generally rectangular notch which together with the corner formed by the end wall and the annular wall of the recess forms a generally rectangular chamber, the axially extending notch diverging slightly outward of the axial center line to provide a nose portion at the axial outer end of the notch, a resilient O-ring positioned in said chamber forming a seal between the seat member and its recess, said O-ring having an initial inner diameter slightly less than the outer diameter of the axially extending notch in the seat member and a thickness greater than the axial length of the chamber, the gate member, sealing surfaces of the seat member and the distance between the end walls of the recesses being so proportioned that there is a slight interference between all sealing surfaces on assembly.

6. A through conduit gate valve comprised of a housing with a bore therethrough, a valve chamber intersecting said bore, a reciprocating slab gate member located in said valve chamber, said gate member provided with a passage alignable with the bore in the open position and a solid portion to cover said bore in the closed position, facing annular recesses surrounding said bore, each recess having an end wall intersecting the bore, an annular wall coaxial with the bore, one side open to the bore and one end open to the valve chamber, a seat member in each of said recesses, each seat member formed of an annular ring having a lesser outer diameter than the annular wall of its recess whereby each seat member loosely fits into its recess, each seat member provided with a passage aligned with the bore, the axial length of each seat member being greater than the axial length of its recess whereby a portion of each seat member protrudes into the valve chamber to form a sealing face for cooperation with a face of the gate member, each sealing face provided with an annular groove, a deformable plastic sealing member positioned in said annular groove, said deformable plastic sealing member extending beyond the plane of the sealing face to form an annular ring of sealing contact area, the inner wall of each seat member provided with a notch, an elastomer sealing member for said notch, said elastomer sealing member extending beyond the plane of the plastic sealing member to effect a low differential pressure seal, each seat member having an axially outward face which opposes the end wall of its recess, the radially outer corner of said axially outward face provided with a generally rectangular notch which together with the corner formed by the end wall and the annular wall of the recess forms a generally rectangular chamber, the axially extending notch diverging slightly outward of the axial center line to provide a nose portion at the axial outer end of the notch, a resilient O-ring positioned in said chamber forming a seal between the seat member and its recess, said O-ring having an initial inner diameter slightly less than the outer diameter of the axially extending notch in the seat member so that it is restrained by the nose of the notch and a thickness greater than the axial length of the chamber, the gate member, sealing surfaces of the seat member and the distance between the end walls of the recesses being so proportioned that there is a slight interference between all sealing surfaces on assembly.

7. A valve comprising a valve body defining a valve chamber and having at least two flow passages in communication with the valve chamber, a valve member having a port formed therein and being movable between open and closed positions within said valve chamber, means for imparting movement to said valve members, annular seat recesses formed in said valve body one about each of said flow passages, an annular metallic seat member movably disposed in each of said seat recesses, means establishing a seal between each of the seat members and the valve body, each of said seat members having an annular sealing face opposing the valve member and an annular groove formed in the sealing face, a deformable plastic sealing member positioned in said groove and extending beyond the plane of said sealing face for engagement with the sealing surface of the valve member, an annular resilient sealing member fixed to the inner periphery of the seat member in concentric relation to said plastic sealing member and extending axially beyond said plastic sealing member, whereby under low line pressure conditions said resilient sealing member will be in engagement with the sealing surface of the valve member and the plastic sealing member will be spaced from the sealing surface of the valve member, under high line pressure conditions both said plastic and resilient sealing members will be in sealing engagement with the sealing surface of the valve member.

8. A valve comprising a valve body defining a valve chamber and having at least two flow passages in communication with the valve chamber, a gate having substantially planar sealing surfaces having a port formed therein and being movable between open and closed positions within said valve chamber, means for imparting movement to said gate, annular seat recesses formed in said valve body one about each of said flow passages, an annular metallic seat member movably disposed in each of said seat recesses, means establishing a seal between each of the seat members and the valve body, each of said seat members having an annular sealing face opposing the gate and an annular groove formed in the sealing face, a deformable plastic sealing member positioned in said groove and extending beyond the plane of said sealing face for engagement with the sealing surface of the gate, an annular resilient sealing member fixed to the seat member in concentric relation to said plastic sealing member and extending axially beyond said plastic sealing member, whereby under low line pressure conditions said resilient sealing member will be in sealing engagement with the gate and the plastic sealing member will be spaced from the gate, under high line pressure conditions both said plastic and resilient sealing members will be in sealing engagement with the gate.

9. An annular metallic seat member adapted to be movably disposed in the seat recess of a valve having a reciprocating gate provided with planar sealing surfaces, said seat member having an annular substantially planar sealing face and an annular groove formed in the sealing face intermediate the inner and outer peripheries of the sealing face, a deformable plastic sealing member having a relatively low modulus of elasticity positioned in said groove and having a portion thereof extending beyond the plane of said sealing face for engagement with a sealing surface of the gate, an annular resilient sealing member having a relatively high modulus of elasticity fixed to the seat member in concentric relation to said plastic sealing member and having a portion thereof extending beyond said plastic sealing member, whereby under low line pressure conditions said resilient sealing member will be in sealing engagement with the gate and the plastic sealing member will be spaced from the gate, under high line pressure conditions both said plastic and resilient sealing members will be in sealing engagement with the gate.

References Cited by the Examiner

UNITED STATES PATENTS

| 2,796,230 | 6/57 | Grove et al. | 251—316 XR |
| 2,985,421 | 5/61 | Anderson et al. | 251—172 |
| 3,050,077 | 8/62 | Wheatley | 251—328 X |
| 3,078,865 | 2/63 | Estes et al. | 137—246.22 |
| 3,082,992 | 3/63 | Vickery | 251—315 XR |
| 3,121,553 | 2/64 | Grove | 251—328 XR |
| 3,122,352 | 2/64 | Anderson et al. | 251—315 XR |
| 3,131,906 | 5/64 | King | 251—360 |

FOREIGN PATENTS

| 1,038,854 | 9/58 | Germany. |

ISADOR WEIL, *Primary Examiner.*